US012586245B2

(12) United States Patent　　　　　(10) Patent No.:　US 12,586,245 B2
　Omar et al.　　　　　　　　　　　　(45) Date of Patent:　　Mar. 24, 2026

(54) ROBUST LIDAR-TO-CAMERA SENSOR ALIGNMENT

(71) Applicant: GM GLOBAL TECHNOLOGY OPERATIONS LLC, Detroit, MI (US)

(72) Inventors: Yousef A. Omar, Troy, MI (US); Hongtao Wang, Madison Heights, MI (US); Hao Yu, Troy, MI (US); Wende Zhang, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 431 days.

(21) Appl. No.: 18/183,423

(22) Filed: Mar. 14, 2023

(65) Prior Publication Data

US 2024/0312059 A1　　Sep. 19, 2024

(51) Int. Cl.
　*G06T 7/80*　　　　(2017.01)
　*G01S 7/497*　　　(2006.01)
　*G01S 17/89*　　　(2020.01)
　*G06T 7/70*　　　　(2017.01)
　*G06V 20/56*　　　(2022.01)

(52) U.S. Cl.
　CPC ................ *G06T 7/80* (2017.01); *G01S 7/497* (2013.01); *G01S 17/89* (2013.01); *G06T 7/70* (2017.01); *G06V 20/56* (2022.01); *G06T 2207/10028* (2013.01); *G06T 2207/30252* (2013.01)

(58) Field of Classification Search
　CPC .......... G01S 17/89; G01S 7/497; G01S 17/86; G01S 7/4808; G01S 17/894; G01S 13/89; G01S 7/2955; G01S 7/4972; G01S 17/931; G01S 13/867; G06T 2207/10028; G06T 2207/30252; G06T 7/70; G06T 7/80;
(Continued)

(56) References Cited

U.S. PATENT DOCUMENTS 10,298,910　B1 *　5/2019　Kroeger ................... G06T 7/85
2019/0293756　A1 *　9/2019　Blaes ................... G01S 7/4026
(Continued)

OTHER PUBLICATIONS

X. Li, F. He, S. Li, Y. Zhou, C. Xia and X. Wang, "Accurate and Automatic Extrinsic Calibration for a Monocular Camera and Heterogenous 3D LiDARs," in IEEE Sensors Journal, vol. 22, No. 16, pp. 16472-16480, 15 Aug. 15, 2022, doi: 10.1109/JSEN.2022. 3189041. (Year: 2022).*

*Primary Examiner* — Gandhi Thirugnanam

*Assistant Examiner* — Aaron Joseph Sorrin

(74) *Attorney, Agent, or Firm* — Ingrassia Fisher & Lorenz, LLP | IF&L

(57)　　　　　　　　ABSTRACT

Method for sensor alignment including detecting a depth point cloud including a first object and a second object, generating a first control point in response to a location of the first object within the depth point cloud and a second control point in response to a location of the second object within the depth point cloud, capturing an image of a second field of view including a third object, generating a third control point in response to a location of the third object detected in response to the image, calculating a first reprojection error in response to the first control point and the third control point and a second reprojection error in response to the second control point and the third control point, generating an extrinsic parameter in response to the first reprojection error in response to the first reprojection error being less than the second reprojection error.

20 Claims, 4 Drawing Sheets

200

(58) Field of Classification Search
CPC ....... G06T 2200/04; G06T 5/50; G06V 20/58;
G06V 20/56
See application file for complete search history.

(56) References Cited

U.S. PATENT DOCUMENTS

| | | | |
|---|---|---|---|
| 2019/0368879 A1* | 12/2019 | Roumeliotis | ............ G07C 5/08 |
| 2020/0334857 A1* | 10/2020 | Garud | .................. G06V 20/647 |
| 2021/0287035 A1* | 9/2021 | Deegan | .................. G06V 10/82 |
| 2022/0276360 A1* | 9/2022 | Ma | ............................ G06T 7/80 |

* cited by examiner

100

200

300

400

ROBUST LIDAR-TO-CAMERA SENSOR ALIGNMENT

INTRODUCTION

The present disclosure generally relates to vehicle sensor alignment systems in a vehicle, and more particularly relates to a method and apparatus for robust lidar-to-camera sensor alignment algorithm using an iterative small angle estimation of flexible n-control points.

Modern vehicles are increasingly being equipped with more and more electronics systems in order to enhance vehicle safety and performance. These electronic systems can include sensors for enabling a vehicle, such as autonomous and semi-autonomous vehicles, to sensor its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

While autonomous vehicles and semi-autonomous vehicles offer many potential advantages over traditional vehicles, in certain circumstances it may be desirable for improved operation of the vehicles. For example, autonomous vehicle features rely on sensor data to be accurately and precisely converted into real world coordinates for data association and sensor fusion. Many systems combine data from different sensors for more accurate predictions. Problems arise when different sensors systems detect different numbers and locations of objects within the sensor field of views. Traditional dynamic sensor to sensor alignment algorithms utilize data pairs, such as camera frames and 3D LiDAR point clouds to perform the alignment in a sequential iterative fashion. When a mismatched number of objects are detected in the different sensor outputs, determining corresponding objects becomes difficult, thereby making sensor correlation inconsistent. Furthermore, other desirable features and characteristics of the present invention will become apparent from the subsequent detailed description and the appended claims, taken in conjunction with the accompanying drawings and the foregoing technical field and background.

SUMMARY

Vehicle sensor system calibration methods. A vehicle control system performing a vehicle control algorithm is operative to receive data from vehicle sensors, solve the alignment as a mathematical optimization problem given a group of Lidar-camera control points with a highly flexible 3D-2D correspondence requirement to generate a correlated sensor data and sensor alignment correction values. In accordance with an aspect of the exemplary embodiment, an apparatus including a lidar sensor having a first field of view for generating a point cloud representative of a plurality of depth detections over the first field of view, a camera having a second field of view for generating an image of the second field of view, a processor for detecting a first object location and a second object location in response to the point cloud, detecting a third object location in response to the image, calculating a first reprojection error between the first object location and the third object location and a second reprojection error between the second object location and the third object location, generating an extrinsic parameter in response to the first reprojection error being less than the second reprojection error and generating an output alignment in response to the extrinsic parameter, and a vehicle controller for controlling the host vehicle in response to the output alignment and a subsequent image captured by the camera.

In accordance with another aspect of the exemplary embodiment, wherein the extrinsic parameter includes at least one of translation value and a rotation value.

In accordance with another aspect of the exemplary embodiment, wherein the extrinsic parameter represent an alignment offset between the lidar sensor and the camera.

In accordance with another aspect of the exemplary embodiment, wherein the first object, the second object and the third object include at least one of a vehicle, a traffic sign, a traffic light, a lane marker, a light pole, a pedestrian, and a calibration target in a controlled environment.

In accordance with another aspect of the exemplary embodiment, wherein each sensor can generate two or more control points in response to two or more detected objects.

In accordance with another aspect of the exemplary embodiment, wherein the first object location is represented as a first control point located at a detected center of the first object, the second object location is represented as a second control point located at a detected center of the second object and the third object location is represented as a third control point located at a detected center of the third object.

In accordance with another aspect of the exemplary embodiment, wherein the first object, the second object and the third object are within the first field of view and the second field of view.

In accordance with another aspect of the exemplary embodiment, a memory for storing the output alignment and wherein the vehicle controller is communicatively coupled to the memory for accessing the output alignment.

In accordance with another aspect of the exemplary embodiment, wherein the first object location is represented as a first control point located at a detected corner of the first object, the second object location is represented as a second control point located at a detected corner of the second object and the third object location is represented as a third control point located at a detected corner of the third object.

In accordance with another aspect of the exemplary embodiment, a method including detecting, by a lidar, a depth point cloud of a first field of view including a first object and a second object, generating a first control point in response to a location of the first object within the depth point cloud and a second control point in response to a location of the second object within the depth point cloud, capturing, by a camera, an image of a second field of view including a third object, generating a third control point in response to a location of the third object detected in response to the image, calculating a first reprojection error in response to the first control point and the third control point and a second reprojection error in response to the second control point and the third control point, generating an extrinsic parameter in response to the first reprojection error in response to the first reprojection error being less than the second reprojection error, generate an output alignment in response to the extrinsic parameter, and controlling a vehicle in response to the output alignment and a subsequent image captured by the camera.

In accordance with another aspect of the exemplary embodiment, wherein the extrinsic parameter is one of a translation and a rotation and is indicative of an alignment offset between the lidar and the camera.

In accordance with another aspect of the exemplary embodiment, wherein the extrinsic parameter represents an alignment offset between the lidar and the camera.

In accordance with another aspect of the exemplary embodiment, wherein the first control point is located at a detected corner of the first object, the second control point is located at a detected corner of the second object and the third control point is located at a detected corner of the third object.

In accordance with another aspect of the exemplary embodiment, wherein the first object, the second object and the third object include at least one of a vehicle, a traffic sign, a traffic light, a lane marker, a light pole, a pedestrian, and a calibration target in a controlled environment.

In accordance with another aspect of the exemplary embodiment, wherein extrinsic parameter includes at least one of a translation and a rotation between the third control point and the first control point.

In accordance with another aspect of the exemplary embodiment, wherein the first control point and the second control point are converted into a camera coordinate in response to the extrinsic parameter and a plurality of orientation angles computed in response to a small angle approximation and an N-point algorithm.

In accordance with another aspect of the exemplary embodiment, wherein the third object is detected using an image processing object detection technique.

In accordance with another aspect of the exemplary embodiment, wherein the processor is further configured to detect a fourth object location in response to the point could and to detect a fifth object location in response to the image and to calculate a third reprojection error in response to the location of the fourth object and the location of the fifth object.

In accordance with another aspect of the exemplary embodiment, a vehicle control system including a lidar sensor for generating a point cloud representative a three dimensional space, a camera for generating an image, a processor for detecting a first object location and a second object location in response to the point cloud, detecting a third object location in response to the image, calculating a first reprojection error between the first object location and the third object location and a second reprojection error between the second object location and the third object location, generating a translation and a rotation in response to the first reprojection error in response to the first reprojection error being less than the second reprojection error and generating an output alignment in response to the translation and the rotation, and a vehicle controller for controlling the host vehicle in response to the output alignment and a subsequent image captured by the camera.

In accordance with another aspect of the exemplary embodiment, wherein the first object location is represented as a first control point located at a detected corner of the first object, the second object location is represented as a second control point located at a detected corner of the second object and the third object location is represented as a third control point located at a detected corner of the third object.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
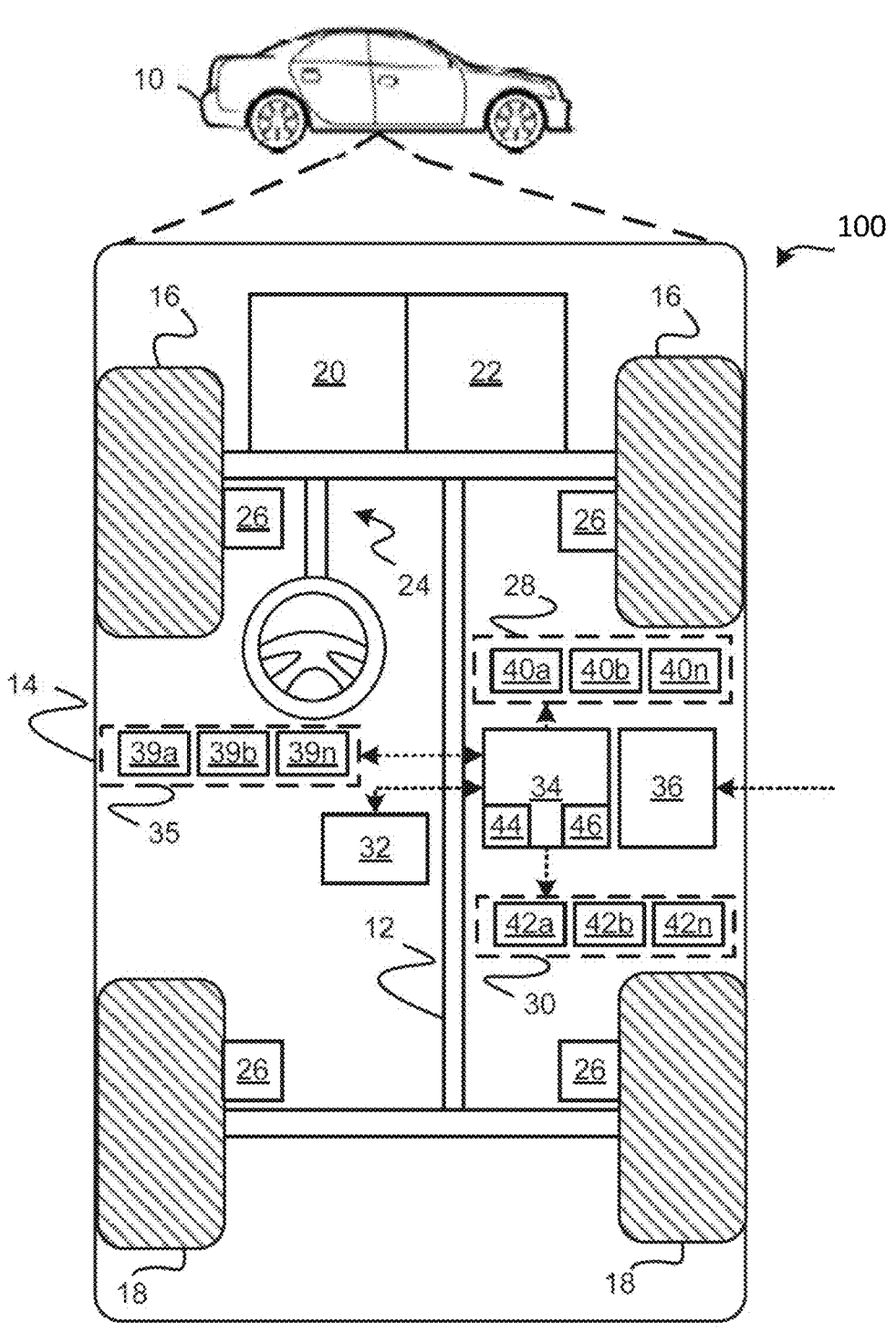
FIG. 1 shows a robust lidar-to-camera sensor alignment algorithm using an iterative small angle estimation of flexible n-control points in accordance with various embodiments.

Turning now to FIG. 1, an exemplary system 100 for robust lidar-to-camera sensor alignment algorithm using an iterative small angle estimation of flexible n-control points is shown in accordance with various embodiments. The exemplary system 100 includes vehicle 10 having a plurality of sensing devices 40a-40n, a propulsion system 20, a transmission system 22, a steering system 24, a brake system 26, a sensor system 28, an actuator system 30, at least one data storage device 32, at least one controller 34, and a communication system 36.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, in various embodiments, the vehicle may be a non-autonomous vehicle and is not limited to the present examples.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors.

In various embodiments, the sensing devices 40a-40n are disposed at different locations of the vehicle 10. In exemplary embodiments described herein, one or more of the sensing devices 40-40n are realized as lidar devices. In this regard, each of the sensing devices 40a-40n may include or incorporate one or more lasers, scanning components, optical arrangements, photodetectors, and other components suitably configured to horizontally and rotatably scan the environment in the vicinity of the vehicle 10 with a particular angular frequency or rotational velocity. In exemplary embodiments described herein, one or more of the sensing devices 40a-40n are realized as optical cameras configured to capture images of the environment in the vicinity of the vehicle 10.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
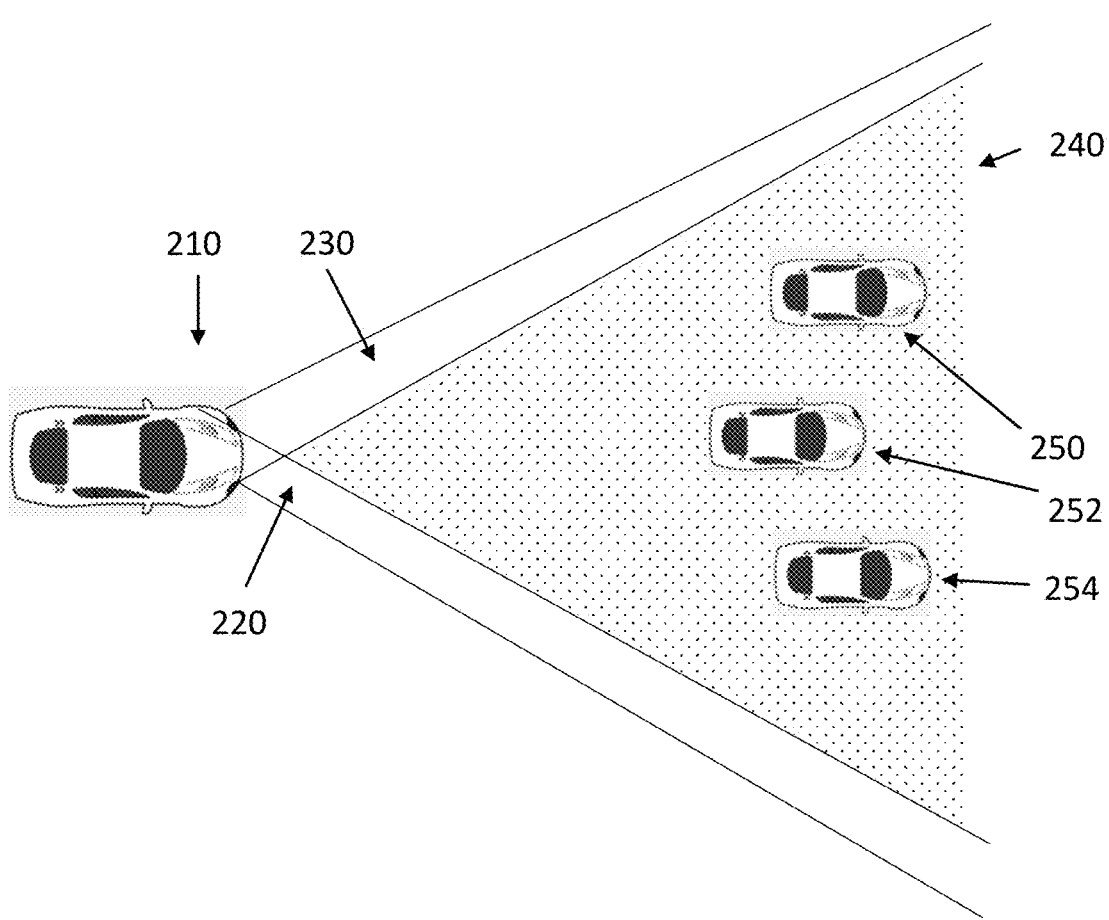
FIG. 2 shows an exemplary environment for robust lidar-to-camera sensor alignment algorithm using an iterative small angle estimation of flexible n-control points in accordance with various embodiments.

Still referring to FIG. 1, in exemplary embodiments, the communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system. For example, the defined maps may be assembled by the remote system and communicated to the autonomous vehicle 10 (wirelessly and/or in a wired manner) and stored in the data storage device 32. In various embodiments, the data storage device 32 stores calibrations for use in aligning the sensing devices 40a-40n. In various embodiments, one or more of the calibrations are estimated as extrinsic parameter using the methods and systems described herein. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In various embodiments, one or more instructions of the controller 34 are embodied in the control system 100 and, when executed by the processor 44, cause the processor 44 to perform the methods and systems that dynamically align the sensor devices by updating calibrations stored in the data storage device 32 as described in greater detail below.

In accordance with various embodiments, the controller 34 implements an autonomous driving system (ADS). Software and/or hardware components of the controller 34 (e.g., processor 44 and computer-readable storage device 46) are utilized to provide an autonomous driving system that is used in conjunction with vehicle 10, for example, to automatically control various actuators 30 onboard the vehicle 10 to thereby control vehicle acceleration, steering, and braking, respectively, without human intervention.

In various embodiments, the instructions of the autonomous driving system 70 may be organized by function or system. For example, the autonomous driving system can include a computer vision system, a positioning system, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. In various embodiments, the computer vision system 74 receives information from and/or implements the control system 100 described herein.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

According to some exemplary embodiments, the control system shown generally at 100 is associated with a vehicle 10. In general, the control system 100 selectively aligns two sensors of the vehicle 10 by estimating extrinsic parameters. As will be discussed in more detail, the estimating is based on a method that utilizes a mathematical optimization problem given a group of Lidar-camera control points with a highly flexible 3D-2D correspondence requirement. In various embodiments, the two sensors include a lidar sensor and a camera sensor. As can be appreciated, other sensors can be implemented in various embodiments.

Turning now to FIG. 2, an exemplary environment 200 for the robust lidar-to-camera sensor alignment algorithm using an iterative small angle estimation of flexible n-control points is shown in accordance with various embodiments. The exemplary environment 200 includes a vehicle 210 having a camera field of view (FOV) 220, a Lidar FOV 230, an overlapping field of view 240, a first proximate vehicle 250, a second proximate vehicle 252, and a third proximate vehicle 254. In some exemplary embodiments, the targets may include lane markings, poles, vehicles, pedestrians, road feature, factory calibration targets, and the like.

Traditional dynamic Lidar-to-Camera alignment algorithms utilize data pairs, such as objects detected in both camera images and 3D lidar point clouds to perform the alignment in a sequential iterative fashion. Under the conditions illustrated in the exemplary environment 200, problems may arise with traditional dynamic Lidar-to-Camera alignment algorithms when one of the sensors detects fewer objects than other sensors, thereby making correspondence of the location of the objects uncertain. For example, assuming we consider vehicles as the targets, if the lidar detects the first proximate vehicle 250 and the second proximate vehicle 252, and the camera detects three proximate vehicles 250, 252, 254, the sensor fusion alignment algorithm may have difficulty estimating the lidar to camera extrinsic parameters, use incorrect lidar-camera corresponding targets, as well as a possibility of rejecting the sample due to uneven correspondence. For example, the sensor fusion alignment algorithm may pair the first proximate vehicle 250 from the lidar detection and the second proximate vehicle 252 from the image detection, thereby introducing an erroneous calibration point.

The current taught system addresses the object paring problem by solving the alignment as a mathematical optimization problem by detecting a group of lidar-camera control points with a flexible 3D-2D correspondence requirement and using control points instead of the iterative process. The algorithm is configured to calibrate lidar-to-camera extrinsic parameters with extracted control points from predefined targets by using any number of control-points it detects to perform the calibration and establishing the correct correspondence among the multimodal sensors. In some exemplary embodiments, 2 or more control points, up to an infinite number of control points, can be used to perform the calibration method.

The exemplary alignment algorithm can use any number of control points to calibrate Lidar-to-Camera sensor orientation with one data capture from both sensors. The control points can be obtained from any target in the FOV of the two sensors without predefining the locations of these targets, such as vehicles, traffic signs, traffic lights, lane markings, light poles, pedestrians, or calibration targets in a controlled environment. The alignment algorithm can save space and cycle time for lidar to camera alignment and is less sensitive to input noise, especially when the detected features across sensor modalities do not match.

The Lidar-to-Camera sensor alignment system can be used to enhance the alignment efficiency for both manufacturing and dynamic alignment and can be adapted to any number of detected control points from both Lidar and camera sensors. The system can be adapted to noisy inputs and is less sensitive to Lidar-Camera detected feature mismatches compared to a traditional perspective-n-points (PnP) algorithm and can be used to calibrate the sensor with large initial errors. In addition, the output alignment will still be valid even if a few targets were partially occluded during the alignment, or some targets were partially/fully missing.

Figure 3:
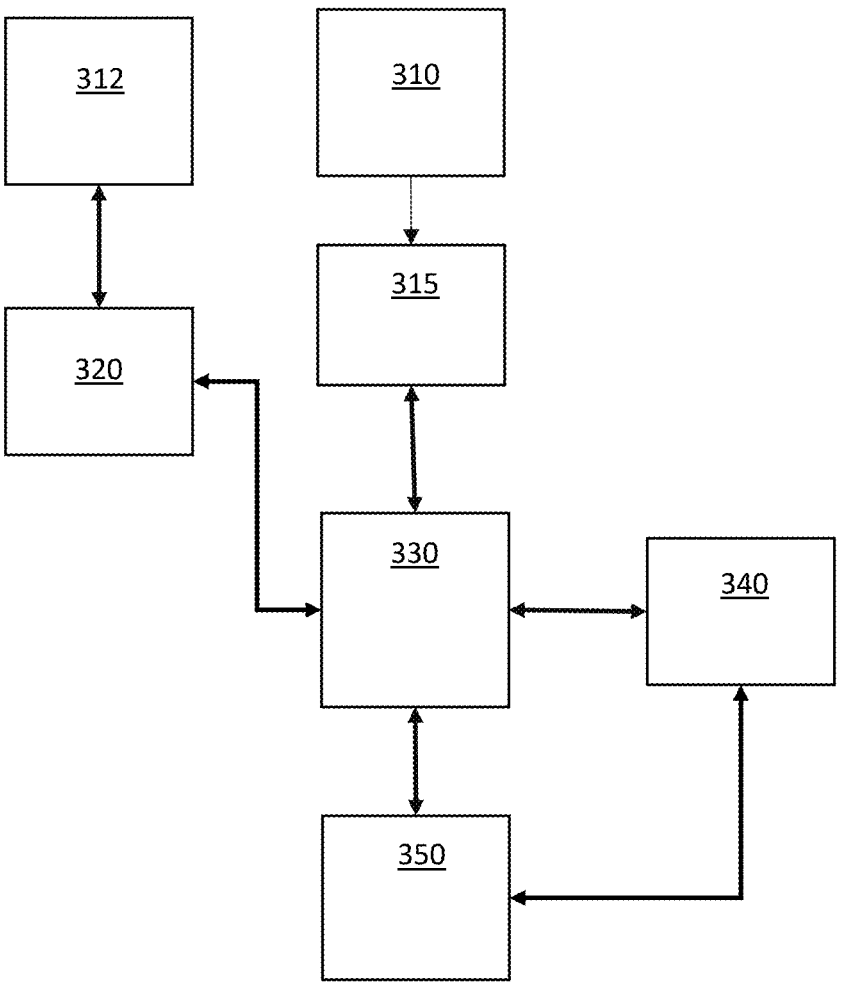
FIG. 3 shows an exemplary block diagram of a system for robust lidar-to-camera sensor alignment algorithm using an iterative small angle estimation of flexible n-control points in accordance with various embodiments.

Turning now to FIG. 3, an exemplary block diagram for a system 300 for robust lidar-to-camera sensor alignment algorithm using an iterative small angle estimation of flexible n-control points is shown in accordance with various embodiments. The exemplary system 300 includes a lidar 312, lidar processor 320, a camera 310, an image processor 315, a sensor system processor 330, a memory 340, and a vehicle controller 350.

The lidar 312 is configured to transmit a light pulse at a known angle and elevation and detect the time of propagation of the light pulse. The lidar 312 can then determine a distance to an object at the known angle and elevation in response to the time of propagation. The lidar 312 can repeat this operation for a plurality of angles and elevations to generate a point cloud of depths to objects within the lidar FOV. Typically, the light pulses are transmitted at regular angle intervals, such as 0.1 degrees and at regular elevation intervals. The larger the number of detection points on the depth map, the longer it takes the lidar to complete the scan of the lidar FOV. A lidar depth map with too many depth points may suffer from stale data due to the long intervals between each data point refresh.

In some exemplary embodiments, the lidar 312 can be configured to couple the detected depths for each of the angles and elevations as individual points or as a point could to the lidar processor 320. The lidar processor 320 may generate the depth map in response to the points and/or point cloud. In addition, the lidar processor 320 may generate a 3 dimensional representation of the field of view including detection and classification of objects within the field of view.

In some exemplary embodiments, the camera 310 can have a FOV. Typically, vehicle mounted cameras 310 can be used for traffic sign recognition, video-based distance control, road guidance, object detection and the like. In some exemplary embodiments, the camera 310 can capture a high definition image which is then coupled to the image processor 315 for object detection. The image processor 315 may run image processing algorithms in response to the image, for detecting and classification of objects within the FOV.

In some exemplary embodiments, the sensor system processor 330, or comparable processor or system for processing sensor data, can receive the extracted control points from the image processor 315 and the extracted control points from the lidar processor 320. The sensor system processor 330 will perform the automated correspondence search in response to the received control points and then trigger the alignment.

Each sensor system has performance advantages and deficiencies over other vehicle sensors. These performance differences may result in one sensor detecting more or less objects than a different sensor over the same field of view. For example, in low light conditions, a lidar may detect more objects in front of a vehicle than a forward facing camera and image processing system. Problems can arise in aligning data from various sensors when different number of objects are detected as the system is not confident in which objects correspond to each other as detected by the various sensors. To address these problem, the sensor system processor 330 can perform a 3D to 2D correspondence search between detected object pairs, calculate a reprojection error for each of the alignments. The alignment pairs with the lowest reprojection error can be assumed to be corresponding objects.

The sensor system processor 330 next performs a 3D to 2D correspondence search among the detected targets from the lidar data and the image data. The correspondence search is configured to identify all possible 3D-2D combinations of control points. For each of the 3D to 2D correspondence possibilities, a reprojection error is calculated utilizing the nominal values for Lidar to camera alignment. The sensor system processor 330 can identify the correct corresponding control points by finding the minimum reprojection error among each of the 3D to 2D correspondence possibilities. After identifying the 3D to 2D correspondence possibilities with the lowest reprojection error, the sensor system processor 330 next converts the 3D control points from lidar coordinate into camera coordinate with known translation and rotation. In some exemplary embodiments, it can assume small angle approximation and apply an N-point algorithm to compute the orientation angles. The resulting lidar to camera extrinsic calibration data can be stored in a memory 340 which can then be accessed by the vehicle controller 350 for control of the vehicle according to an advanced assisted driving algorithm, such as a lane centering operation, adaptive cruise control, or full autonomous vehicle operation.

Figure 4:
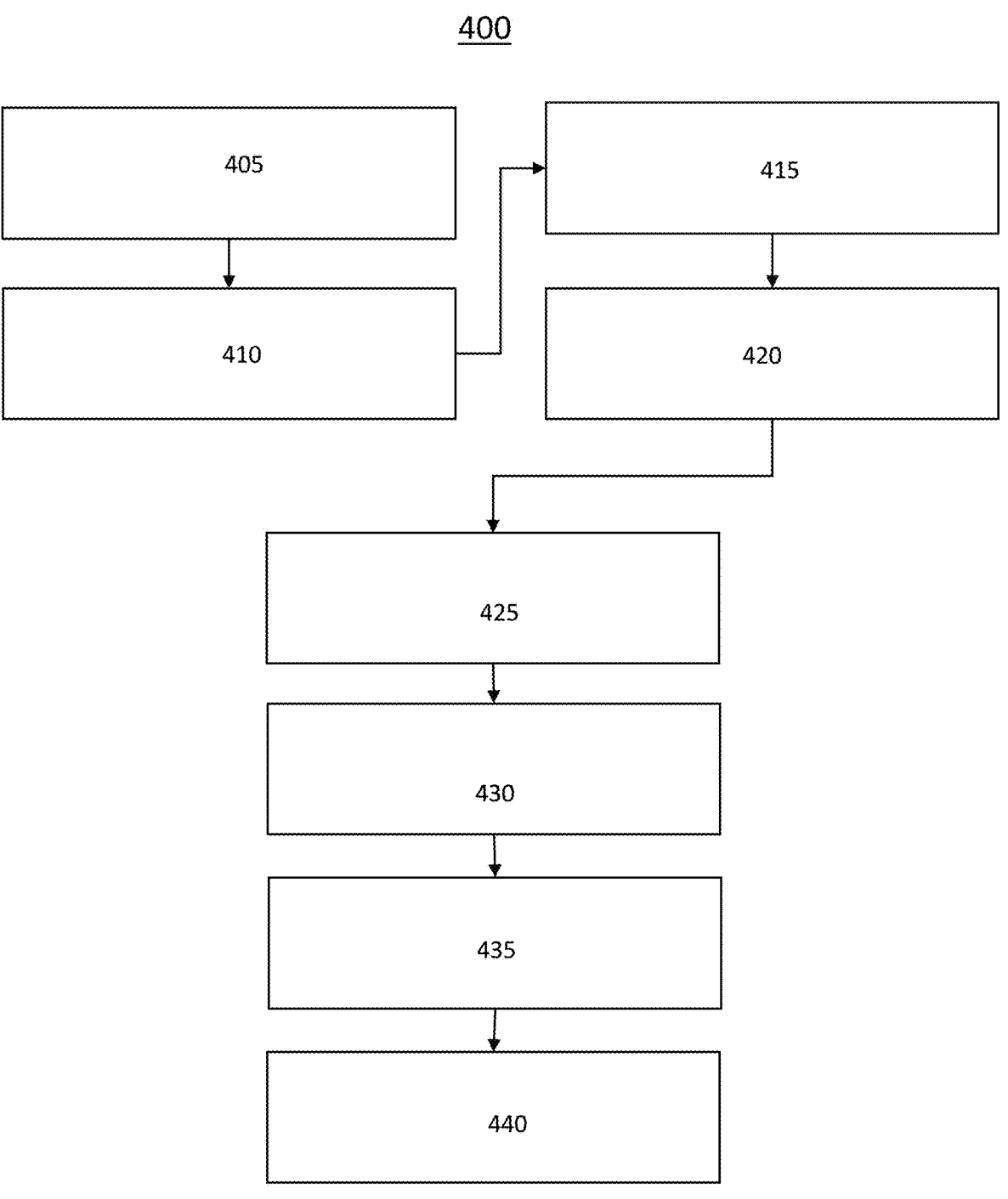
FIG. 4 shows a flowchart illustrating a method for robust lidar-to-camera sensor alignment algorithm using an iterative small angle estimation of flexible n-control points in accordance with various embodiments.

Turning now to FIG. 4, a flow chart illustrating an exemplary implementation of a method 400 for robust lidar-to-camera sensor alignment algorithm using an iterative small angle estimation of flexible n-control points is shown in accordance with various embodiments is shown. While the following method is described as a series of sequential steps, some of the steps may be performed in parallel or non-sequentially, such as capture and processing of the lidar and image data.

In some exemplary embodiments, the method is first operative to acquire 405 data captured by the lidar system over the first field of view. The lidar data may be a depth map or a 3 dimensional point could generated by a lidar processor or the like. In some exemplary embodiments the data may be an aggregate of multiple lidar scans of the field of view.

In response to the lidar data, the method is next configured to detect 410 objects within the lidar data. The method is next operative to acquire 415 at least one image of a second field of view wherein the second field of view at least partially overlaps the first field of view. The image may be captured by a vehicular high resolution camera or the like. The method next detects 420 2D objects within the image. Objects may be detected in the image in response to any number of image processing techniques. The object detected with the image can further be represented as 2D control points in the camera image coordinate.

The method next performs 425 a 3D to 2D correspondence search among the detected targets from the Lidar data and the image data. The correspondence search is configured to identify all possible 3D-2D combinations of control points. For example, for two lidar detected objects (1,2) and three image detected objects (a,b,c), there would be six 3D to 2D correspondence possibilities: (1-a, 2-b), (1-a, 2-c), (1-b, 2-a), (1-b, 2-c), (1-c, 2-a), and (1-c, 2-b).

For each of the 3D to 2D correspondence possibilities, the method is next operative to calculate 430 a reprojection error utilizing the nominal values for Lidar to camera alignment. A reprojection error is a 2d vector of the difference between a measured and projected point. The reprojection error measures the distance between the reprojection of a model estimation and its corresponding true projection. In some exemplary embodiments, the reprojection error is measured in pixels on the image plane. The correct corresponding control points are identified 435 by finding the minimum reprojection error among each of the 3D to 2D correspondence possibilities.

In response to identifying the 3D to 2D correspondence possibilities with the lowest reprojection error, the method next converts the 3D control points from lidar coordinate into camera coordinate with known translation and rotation.

In some exemplary embodiments, it can assume small angle approximation and apply an N-point algorithm to compute the orientation angles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A lidar to camera sensor alignment system comprising:
  a lidar sensor having a first field of view for generating a point cloud representative of a plurality of depth detections over the first field of view;
  a camera having a second field of view for generating an image of the second field of view;
  a processor for detecting a first object location and a second object location in response to the point cloud, detecting a third object location in response to the image, calculating a first reprojection error between the first object location and the third object location and a second reprojection error between the second object location and the third object location, determining an alignment pair in response to a lowest reprojection error between the first reprojection error and the second reprojection error wherein the alignment pair with the lowest reprojection error are determined to be corresponding objects, generating a lidar to camera extrinsic parameter between the first object location and the third object location in response to the first reprojection error being the lowest reprojection error being indicative of the first object and the third object being corresponding objects, and generating an output alignment in response to the lidar to camera extrinsic parameter; and
  a vehicle controller for controlling the host vehicle in response to the output alignment and a subsequent image captured by the camera.

2. The apparatus of claim 1, wherein the lidar to camera extrinsic parameter includes at least one of translation value and a rotation value and wherein the first object location includes a first plurality of control points, the second object location includes a second plurality of control points, and the third object location includes a third plurality of control points and wherein the processor is further operative to perform a correspondence search to identify a first plurality of combinations of each of the first plurality of control points and the third plurality of control points, and a second plurality of combinations of each of the second plurality of control points and each of third the plurality of control points, and wherein the processor is further configured to calculate a reprojection error for each of the first plurality of combinations and the second plurality of combinations and wherein the first reprojection error is a minimum reprojection error among each of the first plurality of combinations and the second plurality of combinations.

3. The apparatus of claim 1, wherein the lidar to camera extrinsic parameter represent an alignment offset between the lidar sensor and the camera.

4. The apparatus of claim 1, wherein the first object, the second object and the third object include at least one of a vehicle, a traffic sign, a traffic light, a lane marker, a light pole, a pedestrian, and a calibration target in a controlled environment.

5. The apparatus of claim 1, wherein the lidar each sensor can generate two or more control points in response to two or more detected objects.

6. The apparatus of claim 1, wherein the first object location is represented as a first control point located at a detected center of the first object, the second object location is represented as a second control point located at a detected center of the second object and the third object location is represented as a third control point located at a detected center of the third object.

7. The apparatus of claim 1, wherein the first object, the second object and the third object are within the first field of view and the second field of view.

8. The apparatus of claim 1, further including a memory for storing the output alignment and wherein the vehicle controller is communicatively coupled to the memory for accessing the output alignment.

9. The apparatus of claim 1, wherein the first object location is represented as a first control point located at a detected corner of the first object, the second object location is represented as a second control point located at a detected corner of the second object and the third object location is represented as a third control point located at a detected corner of the third object.

10. A method for performing a lidar to camera alignment algorithm comprising:
  detecting, by a lidar, a depth point cloud of a first field of view including a first object and a second object;
  generating a first control point in response to a location of the first object within the depth point cloud and a second control point in response to a location of the second object within the depth point cloud;
  capturing, by a camera, an image of a second field of view including a third object;
  generating a third control point in response to a location of the third object detected in response to the image;
  calculating a first reprojection error in response to the first control point and the third control point and a second reprojection error in response to the second control point and the third control point;
  determining an alignment pair in response to a lowest reprojection error between the first reprojection error and the second reprojection error wherein the alignment pair with the lowest reprojection error are determined to be corresponding objects;
  generating a lidar to camera extrinsic parameter between the first object location and the third object location in response to the first reprojection error in response to the first reprojection error being less than the second reprojection error;
  generating an output alignment in response to the lidar to camera extrinsic parameter; and
  controlling a vehicle in response to the output alignment and a subsequent image captured by the camera.

11. The method of claim 10, wherein the lidar to camera extrinsic parameter is one of a translation and a rotation and is indicative of an alignment offset between the lidar and the camera.

12. The method of claim 10, wherein the lidar to camera extrinsic parameter represents an alignment offset between the lidar and the camera.

13. The method of claim 10, wherein the first control point is located at a detected corner of the first object, the second control point is located at a detected corner of the second object and the third control point is located at a detected corner of the third object.

14. The method of claim 10 wherein the first object, the second object and the third object include at least one of a vehicle, a traffic sign, a traffic light, a lane marker, a light pole, a pedestrian, and a calibration target in a controlled environment.

15. The method of claim 10 wherein extrinsic parameter includes at least one of a translation and a rotation between the third control point and the first control point.

16. The method of claim 10, wherein the first control point and the second control point are converted into a camera coordinate in response to the extrinsic parameter and a plurality of orientation angles computed in response to a small angle approximation and an N-point algorithm.

17. The method of claim 10, wherein the third object is detected using an image processing object detection technique.

18. The method of claim 10, wherein the processor is further configured to detect a fourth object location in response to the point cloud and to detect a fifth object location in response to the image and to calculate a third reprojection error in response to the location of the fourth object and the location of the fifth object.

19. A vehicle control system comprising:

a lidar sensor for generating a point cloud representative a three dimensional space;

a camera for generating an image;

a processor for detecting a first object location and a second object location in response to the point cloud, detecting a third object location in response to the image, calculating a first reprojection error between the first object location and the third object location and a second reprojection error between the second object location and the third object location, determining an alignment pair in response to a lowest reprojection error between the first reprojection error and the second reprojection error wherein the alignment pair with the lowest reprojection error are determined to be corresponding objects, generating a translation and a rotation between the alignment pair in response to the first reprojection error and in response to the first object and the third object being determined to be the alignment pair, and generating an output alignment in response to the translation and the rotation; and a vehicle controller for controlling the host vehicle in response to the output alignment and a subsequent image captured by the camera.

20. The vehicle control system of claim 19, wherein the first object location is represented as a first control point located at a detected corner of the first object, the second object location is represented as a second control point located at a detected corner of the second object and the third object location is represented as a third control point located at a detected corner of the third object.

* * * * *